July 4, 1961  H. S. VAN BUREN, JR  2,990,595
SNAP FASTENER
Filed Nov. 19, 1956

INVENTOR:
HAROLD S. VAN BUREN JR.,
BY Robert E Ross
ATTORNEY.

2,990,595
SNAP FASTENER
Harold S. van Buren, Jr., Cambridge, Mass., assignor to United-Carr Fastener Corporation, Cambridge, Mass., a corporation of Delaware
Filed Nov. 19, 1956, Ser. No. 623,101
1 Claim. (Cl. 24—208)

This invention relates generally to fastening devices, and has particular reference to a snap fastener for use on clothing or the like.

With the development of new types of plastics which are capable of withstanding the temperatures involved in laundering and the chemicals used in dry cleaning, it has been thought desirable to provide a clothing snap fastener made of injection molded plastic, since such materials may be formed in various colors and are economical to manufacture. However, fasteners of this type have not been used in any great quantities for a number of reasons. It has been thought that to impart sufficient strength to the fastener to resist disengaging forces, it must be massive, with the holding portions being relatively thick, which makes the fastener so bulky that it is unsuitable for use in many types of garments. It has also been found that in the manufacture of this type of fastener, extremely close tolerances must be met. Since fasteners of this type operate by interference between the stud and socket, a small variation in the size of the engaging portions creates a large variation in the action of the fastener, that is, whether it is easy or difficult to snap and unsnap the stud and socket. Since moisture also has an effect on the dimensions of the parts, variations in snapping action can occur even with parts held to the proper manufacturing tolerance.

The object of this invention is to provide a snap fastener having a stud and socket formed of resilient plastic which are so shaped as to have an adequate snap action through the range of size variations resulting from normal manufacturing processes and subsequently occurring in normal use.

A further object of this invention is to provide a snap fastener socket member having a relatively thin wall adapted for radial expansion to enclose the stud in which means is provided at the foremost edge of the wall to restrict the entrance to the stud cavity and to reinforce the edge of the wall against fracturing.

Other objects of the invention will be apparent to one skilled in the art from the following description of a specific embodiment thereof.

Figure 1:
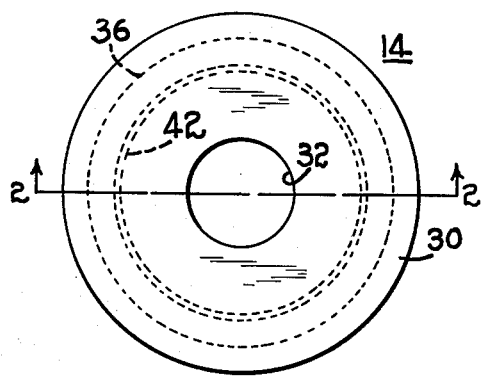
Figure 2:
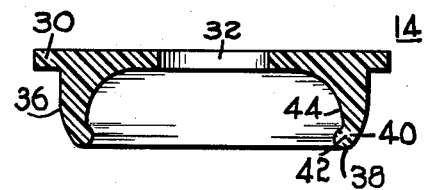
Figure 3:
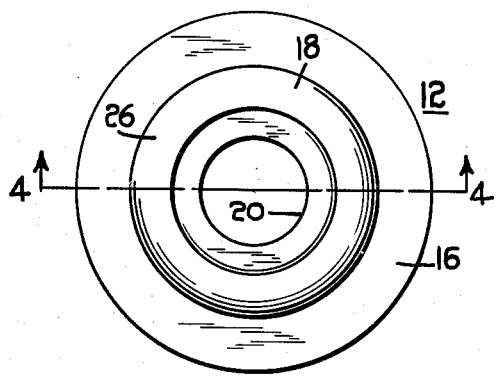
Figure 4:
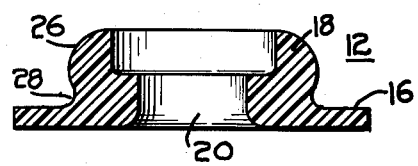
Figure 5:
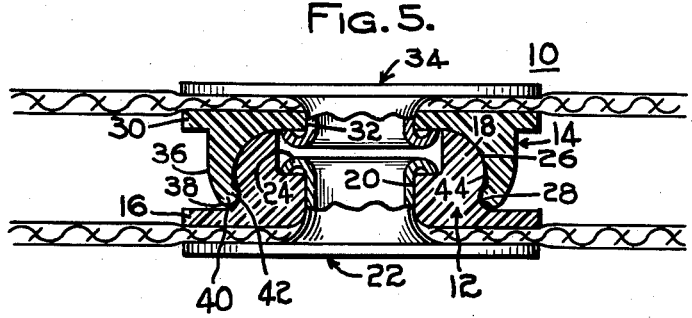

In the drawing:
FIG. 1 is a plan view of a socket member embodying the features of the invention;
FIG. 2 is a view in section taken on line 2—2 of FIG. 1;
FIG. 3 is a plan view of a stud for use with the socket of FIG. 1;
FIG. 4 is a view in section taken on line 4—4 of FIG. 3; and
FIG. 5 is a view in section of the stud and socket attached to supporting sheets and disposed in snapping engagement.

Referring to the drawing there is illustrated a snap fastener assembly 10 which comprises a stud 12 and a socket 14 which are adapted for snapping engagement.

The stud 12 is preferably formed of a single piece of molded plastic and comprises a base 16 and a socket-engaging portion 18 protruding forwardly from the base with a central aperture 20 extending therethrough to receive an attaching rivet 22. The aperture 20 is enlarged at the forward end to receive the curled retaining end 24 of the rivet. The socket-engaging portion 18 has an outer surface 26 which is convex in transverse section, and is rounded smoothly to the foremost end and provides a neck 28 of reduced diameter immediately adjacent to the base.

The socket 14 comprises generally a base 30 having an aperture 32 for receiving an attaching rivet 34 and a forwardly extending peripheral wall 36 disposed on the base forming a stud-receiving cavity. The wall 36 is relatively thick at the junction with the base and decreases in thickness toward the foremost edge 38 of the stud receiving cavity, so that approximately the foremost half of the wall is relatively thin and circumferentially expansible.

The foremost portion 40 of the wall is inclined radially inwardly to provide a restricted entrance to the stud-receiving cavity, and also to strengthen the foremost edge 38 against fracture. For this and other purposes, the edge 38 may be provided with a bead 42 which has a diameter slightly greater than that of the portion of the wall immediately rearwardly thereof. The provision of the inwardly inclined foremost edge portion 40 and the bead 42 permits the forward half of the socket wall to be as thin as possible to provide circumferential resiliency yet imparts strength to the foremost edge of the socket to prevent fracturing.

The inner surface 44 of the wall is generally concave in transverse section and curves smoothly into the base at the rearmost portion, so that the shape thereof conforms generally to the shape of the exterior surface of the stud. Hence, when the stud is assembled into the socket, the stud is enclosed by the socket wall throughout substantially its entire length, so that tilting or axial movement of the stud in the socket is prevented. The structure of the socket wall permits the parts to have dimensions such that a relatively large difference in size exists between the restricted entrance of the socket and the diameter of the largest portion of the socket.

In a specific embodiment of the invention, a stud having a diameter at the largest portion of between .390 and .395 inch, which is normal manufacturing tolerance, was found to have an excellent snap action and holding power with a socket having an entrance diameter of from .370 to .375 inch, which is normal manufacturing tolerance of a device having this shape. Hence, it is seen that the interference between the stud and socket may range from .015 inch to .025 inch. The maximum difference in interference in an average group of studs and sockets is, therefore, .010 inch. However, the total interference is sufficiently great that this amount of variation does not unduly affect the snap action, since the structure of the socket enables it to accommodate this variation in size and still provide an adequate snap action and holding power.

Since certain obvious changes may be made in the device without departing from the scope of the invention, it is intended that all matter contained herein be interpreted in an illustrative and not in a limiting sense.

I claim:
A snap fastener assembly comprising a stud member and a socket member adapted for operative engagement with one another, said stud member including a base portion having a flat planar surface for engagement with the surface of a support, and a hollow socket engaging portion integral with the opposite surface of said base and extending outwardly therefrom in substantially transverse relationship thereto, said socket engaging portion having its outside surface substantially convex in configuration and providing an inwardly extending circumferential portion on the outside surface of said socket engaging portion immediately adjacent its line of jointure with said base portion, said socket member including a base portion having a substantially flat planar surface for engagement with the surface of a support, and a hollow socket portion integral with the opposite surface of said base and extending outwardly therefrom in generally transverse relationship thereto, said socket portion having its inside surface substantially concave in configuration, the part of said socket portion abutting said base portion of said socket member being relatively thick with the remaining part of said socket portion extending outwardly therefrom and decreasing in thickness in cross-section forming a radially inwardly extending free end portion forming a restricted entrance to the hollow stud receiving area of the socket portion, whereby upon the positioning of said socket engaging portion of said stud member within the socket portion of said socket member the respective convex and concave surfaces will be in abutting engagement with one another, with the inwardly extending free end portion of said socket portion being in cooperative flush circumferential engagement with the inwardly extending portion on the outside surface of said socket engaging portion.

References Cited in the file of this patent

UNITED STATES PATENTS

| | | |
|---|---|---|
| 1,873,370 | Ford | Aug. 23, 1932 |
| 2,170,216 | Rau | Aug. 22, 1939 |
| 2,256,849 | Purinton | Sept. 23, 1941 |
| 2,379,529 | Kennedy | July 3, 1945 |
| 2,440,170 | Duefrene | Apr. 20, 1948 |
| 2,548,004 | Duefrene | Apr. 10, 1951 |
| 2,612,139 | Collins | Sept. 30, 1952 |
| 2,714,269 | Charles | Aug. 2, 1955 |
| 2,724,884 | Jones | Nov. 29, 1955 |
| 2,851,756 | Jones | Sept. 16, 1958 |

FOREIGN PATENTS

| | | |
|---|---|---|
| 896,043 | France | Apr. 17, 1944 |